Aug. 12, 1924.
G. E. RUFFNER
THRUST BEARING
Filed Sept. 12, 1921
1,504,513
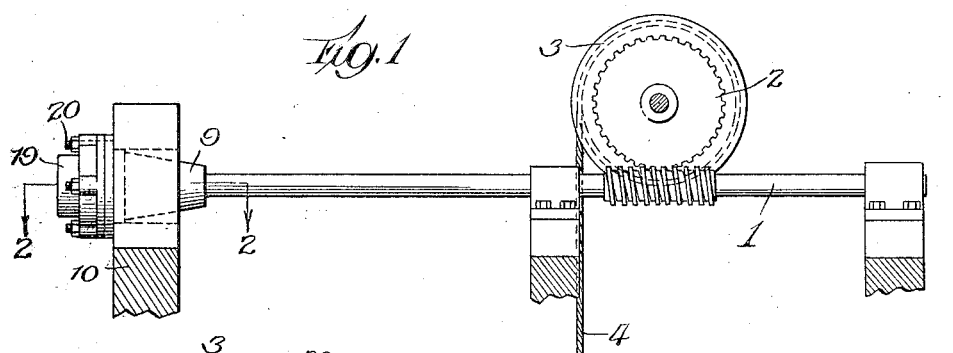
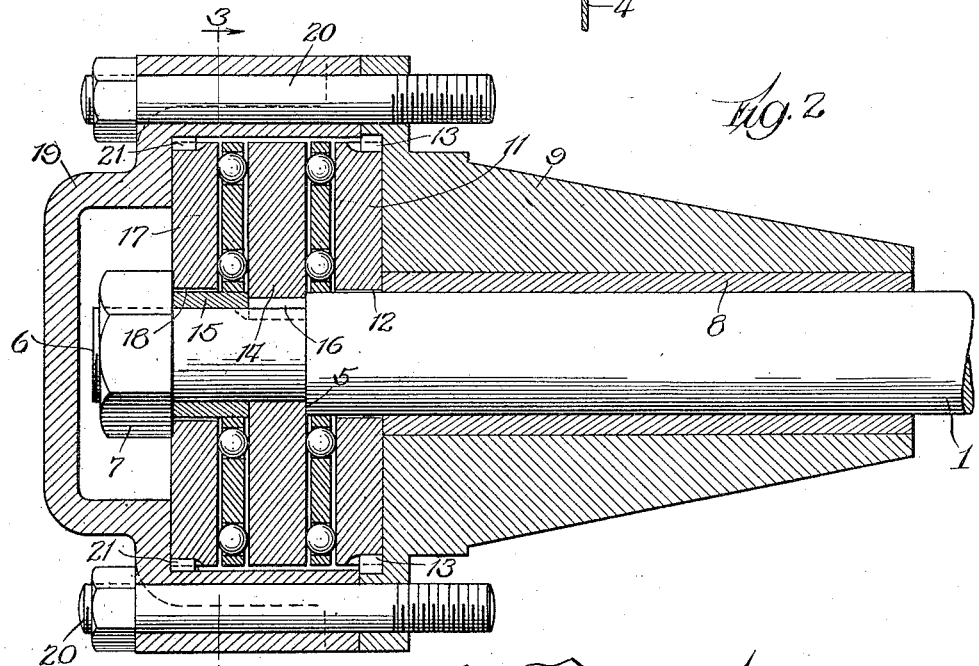
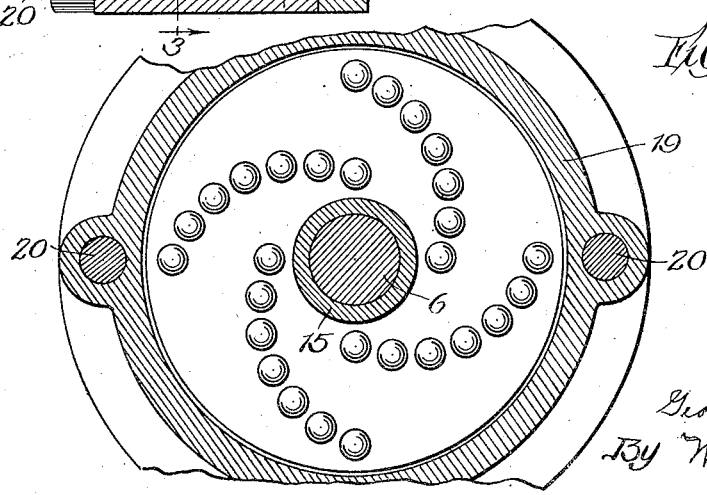
Inventor
George E. Ruffner
By Wm. O. Belt Atty.

Patented Aug. 12, 1924.

1,504,513

UNITED STATES PATENT OFFICE.

GEORGE E. RUFFNER, OF RACINE, WISCONSIN.

THRUST BEARING.

Application filed September 12, 1921. Serial No. 500,250.

*To all whom it may concern:*

Be it known that I, GEORGE E. RUFFNER, a citizen of the United States, residing at Racine, in the county of Racine and State of Wisconsin, have invented certain new and useful Improvements in Thrust Bearings, of which the following is a specification.

This invention relates to thrust bearings and has for its principal object to provide a structure in which wear is eliminated to a greater extent than has heretofore been possible.

More specifically, the object is to produce a structure in which all of the contact is between hardened surfaces of great area and the thrust in different directions is taken by different surfaces.

Further objects will become apparent as the description is read in connection with the accompanying drawing in which—

Fig. 1 is an elevation showing my device applied to the power shaft of a conventional form of elevator;

Fig. 2 is a cross section taken on the line 2—2 of Fig. 1; and

Fig. 3 is a transverse section on the line 3—3 of Fig. 2.

In the drawings, 1 indicates a worm shaft which drives the worm gear 2 attached to the drum 3 on which the cable 4 is wound. One end of the shaft 1 is reduced to form a shoulder 5 and is threaded at 6 to receive a nut 7. Adjacent to the reduced portion the shaft is journalled in a babbitt or other bearing 8 carried by the support 9, mounted on suitable base 10. Secured to the support 9 is a disc 11 having an opening 12 of sufficient diameter to allow the shaft to pass freely through it, and this disk is pinned or keyed to the support at a plurality of points 13 so that it may be held out of contact of the shaft at all times. A second disk 14 rests against the shoulder 5 on the shaft and is securely held in that position by a sleeve 15 on the nut 7; a key or other device 16 secures the disk 14 against rotation relative to the shaft 1. The third disk 17 having an opening 18 of sufficient diameter to clear the sleeve 15 is secured within a bonnet 19 fastened to the support 9 by the bolts 20; and pins or other devices 21 therein secure this disk to the bonnet in the same way that pins 13 secure the disk 11 to the support 9. The disks 11, 14 and 17 have their adjacent faces hardened and between these hardened faces I interpose a plurality of anti-friction devices here shown as case-hardened balls arranged in spiral rows so as to distribute the wear over the entire surface of the disk.

The disk 14 is rigidly secured to the shaft against either relative rotation or longitudinal movement and the disks 11 and 17 are tightly clamped between the faces of the support 9 and a bonnet 19. By this arrangement all play in the bearing can be eliminated and the wearing surfaces of the balls and the disks brought into such intimate contact that the operator cannot make the shock of starting or stopping the elevator take the form of a blow on any of the hardened surfaces, and by having the thrust to the left taken by one set of surfaces and the thrust to the right by another set of surfaces together with the distribution of the balls illustrated, wear is so much eliminated that the bearing will operate for long periods without developing sufficient play to result in any appreciable movement of the shaft relative to the support.

In the thrust bearings heretofore used in similar structures, the constant and severe use of small areas resulted in rapid wear producing a looseness or play by which quick movements of the shaft had the effect of terrific blows on the bearings. This very soon cracked the balls or rollers and of course, destroyed the value of the bearing. By the structure here illustrated I reduce the wear and consequent looseness to a very small minimum and I have found by long tests in the heavy duty over elevators that this bearing will require practically no attention for periods extending over many months.

I am aware that changes in the form and proportion of parts, and in the details of construction of my invention may be made without departing from the spirit or sacrificing any of the advantages thereof, and I reserve the right to make all such changes as fairly fall within the scope of the following claims.

I claim:

1. In a thrust bearing, the combination of a support, a shaft journalled therein and projecting at one end thereof, a thrust collar secured on the projecting portion of the shaft, a bearing plate bearing against and secured to the said end of the support, anti-friction devices between the collar and the bearing plate, a bonnet housing the projecting end of the shaft, the collar and the bearing plate and secured to the support, a second bearing plate within and secured to the bonnet and located at the outer side of the thrust collar, anti-friction devices between the collar and the second bearing plate, the shaft having a shoulder engaging the inner side of the collar, and a nut on the end of the shaft and provided with a part engaging the thrust collar and clamping the same against the shoulder.

2. In a thrust bearing, the combination of a support, a shaft journalled in the support and projecting at one end thereof, the projecting end of the shaft having a shoulder, a thrust collar keyed to the projecting end of the shaft and engaging the shoulder, a nut on the end of the shaft and provided with a part engaging the collar and clamping the same against the shoulder, a bonnet housing the projecting end of the shaft and the thrust collar and secured to the support, bearing plates loosely receiving the projecting end of the shaft and disposed at opposite sides of the collar and connected respectively to the support and the bonnet, and anti-friction devices between the collar and the respective bearing plates.

GEORGE E. RUFFNER.